United States Patent [19]
Kitai

[11] 3,977,908
[45] Aug. 31, 1976

[54] INDICATOR IN USE WITH A LEAD STORAGE BATTERY FOR INDICATING THE OVERDISCHARGE OF THE SAME AND THE LOWERED LEVEL OF THE ELECTROLYTE THEREIN

[75] Inventor: Yasuo Kitai, Kumagaya, Japan

[73] Assignee: Shin-Kobe Electric Machinery Co., Ltd., Tokyo, Japan

[22] Filed: Apr. 14, 1975

[21] Appl. No.: 567,490

Related U.S. Application Data

[63] Continuation of Ser. No. 376,711, July 5, 1973, abandoned.

[30] Foreign Application Priority Data

Oct. 17, 1972 Japan.................. 47-119792[U]

[52] U.S. Cl................................ 136/182; 73/327
[51] Int. Cl.²................. H01M 10/48; G01F 23/00
[58] Field of Search............. 136/182; 73/291, 447, 73/327

[56] References Cited
UNITED STATES PATENTS

| | | | |
|---|---|---|---|
| 2,631,182 | 3/1953 | Hall et al. | 136/182 |
| 3,543,581 | 12/1970 | Ryder | 136/182 |
| 3,597,973 | 8/1971 | Ryder | 73/291 |
| 3,895,964 | 7/1975 | Sakamoto | 136/182 |

*Primary Examiner*—Donald L. Walton
*Attorney, Agent, or Firm*—Woodling, Krost, Granger & Rust

[57] ABSTRACT

An indicator in use with a lead storage battery comprising a case and battery elements disposed in said case, said battery elements including electrolyte and a set of plates, said indicator adapted to indicate the overdischarge of said storage battery and also the lowered level of said electrolyte beyond minimum allowable level. The indicator comprises a cylindrical hollow body of transparent material with the upper end of the body exposed to the top of the case and with the lower end of the body positioned substantially at the minimum allowable level of the electrolyte, said lower end of the body communicating the electrolyte within the case. A colored float is disposed within the cylindrical body for vertical movement therein, said float having a specific gravity less than that of the electrolyte when the storage battery is charged at predetermined degree and greater than that of the electrolyte when the storage battery is discharged beyond the minimum allowable degree of charging condition. Reflective means is provided in the cylindrical body at the lower end thereof to reflect light from the upper face of the body through the thickness thereof in horizontal and vertical directions. When the storage battery is charged at more than predetermined degree, then the float is positioned in no alignment with reflective means whereby no light passes through the float with a result that the upper face of the cylindrical body is found to shine. When the storage battery is discharged beyond the minimum allowable degree of charging condition or when it has the electrolyte level lower than the minimum allowable level, then the float is positioned adjacent to the lower end of the body in alignment with reflective means whereby light passes through the colored float with a result that the upper face of the cylindrical body is found to provide a colored annulus.

2 Claims, 7 Drawing Figures

INDICATOR IN USE WITH A LEAD STORAGE BATTERY FOR INDICATING THE OVERDISCHARGE OF THE SAME AND THE LOWERED LEVEL OF THE ELECTROLYTE THEREIN

CROSS-REFERENCES TO RELATED APPLICATIONS

This is a Continuation Application of the parent case, U.S. Ser. No. 376,711, now abandoned, filed July 5, 1973.

FIELD OF THE INVENTION

This invention pertains to a lead storage battery, and more particularly to an indicator incorporated in a lead storage battery for indicating the overdischarge of the storage battery and reduction of electrolyte in the storage battery.

BACKGROUND OF THE INVENTION

A lead storage battery has liquid electrolyte of dilute sulfuric acid employed therein, the concentration of which is generally determined by measuring specific gravity thereof. It is well known that the specific gravity of the electrolyte in the storage battery, when it is charged, is relatively greater and when discharged, relatively smallr. By way of a lead storage battery for a vehicle, for example it has specific gravity of 1.260 (20°C) when completely charged and has that of 1.110 when charged by 25 percent. Thus, the charge and discharge of the lead storage battery has been generally examined by measuring the specific gravity of the electrolyte in the storage battery.

The prior art device for measuring the specific gravity of the electrolyte is generally of a floating type hydrometer which comprises a glass sleeve with a rubber hollow ball-like head fitted to the top of the sleeve, which is substantially similar to a squirt gun, and a float received in the glass sleeve and graduated on the surface thereof. One of the disadvantages of the prior art is to make its treatment troublesome because the operator must suck up the electrolyte by means of the glass sleeve with the rubber head through the opening of the battery case. Another disadvantage of the prior art is to impair the clothes on the body of the operator and the matters around the storage battery, such as the instruments and the likes, because the electrolyte is corrosive. In view of the foregoing disadvantages, there has been proposed an arrangement wherein a floating ball of constant specific gravity is floated on the electrolyte in the battery case for allowance of vertical movement therein so that the operator can examine the level position of the float ball through the graduated wall of the battery case. However, in some storage batteries, such as those for vehicles their cases have been formed of opaque material, such as ebonite, polypropylene and the likes and as a result the above-described arrangement cannot be applied for such storage batteries.

Since the electrolyte in the battery case is consumed due to decomposition of water in the electrolyte which occurs during charge of the battery and evaporation of water and is reduced in level, the operator is often required to supplement water in the electrolyte, because the storage battery is otherwise reduced in its life and performance. However, the storage battery with opaque case as above-mentioned requires the operator to check or monitor the level of the electrolyte in the case through the opening thereof to cause the operation to be troublesome and the level of the electrolyte in the case to fail to be checked.

SUMMARY OF THE INVENTION

Accordingly, it is a principal object of the invention to provide an indicator in use with a lead storage battery adapted to make simplified the check of the electrolyte in its specific gravity even though the storage battery has an opaque case.

It is further object of the invention to provide an indicator in use with a lead storage battery adapted to examine the electrolyte level in a case as well as the specific gravity of the electrolyte therein.

In accordance with the present invention, there is provided an indicator in use with a lead storage battery comprising a case and battery elements disposed in said case, said battery elements including electrolyte and a set of plates, said indicator adapted to indicate the overdischarge of said storage battery and also the lowered level of said electrolyte beyond minimum allowable level, said indicator comprising a cylindrical hollow body of transparent material with the upper end of said body exposed to the top of said case and with the lower end of said body dipped in said electrolyte, said lower end of said body having an opening to receive said electrolyte in said hollow body therethrough and positioned substantially at said minimum allowable level of said electrolyte, reflective means disposed adjacent to the lower end of said cylindrical body to reflect light from the upper face of said cylindrical body therethrough in vertical and inwardly diametrical directions and a colored float disposed in said cylindrical body for vertical movement therein and having a specific gravity less than that of said electrolyte when said storage battery is charged at more than minimum allowable degree and greater than that of said electrolyte when said storage battery is discharged beyond said minimum allowable degree of charging condition.

BRIEF DESCRIPTION OF THE DRAWING

The above and other objects and advantages of the present invention will become apparent from the teachings of the following description of a preferred embodiment with reference to the accompanying drawing.

DETAILED DESCRIPTION OF PREFERRED EMBODIMENT

Figure 1:
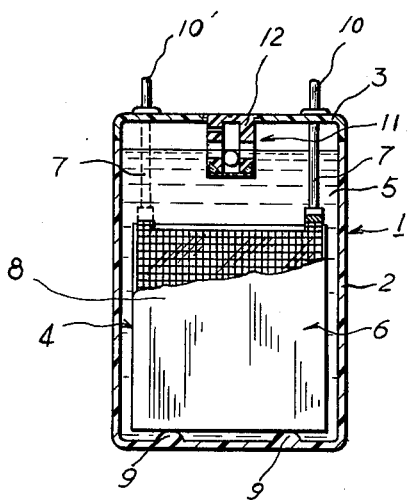
FIG. 1 is a vertical sectional view of a lead storage battery embodying the present invention.

Referring now to FIG. 1, a lead storage battery is illustrated and designated generally at numeral 1 and the storage battery 1 comprises a molded case 2 which may be formed of insulating and acid resisting opaque material such as ebonite, polypropylene and the like, but which may be alternatively formed of transparent material of insulation and of acid resistance, with a cover 3 mounted on the top of the case 2 and secured thereto by any suitable means in tight engagement therewith. The case 2 together with the cover 3 has a plurality of cells defined by the case and the traverse partitions (not shown), one of which is illustrated in FIG. 1. Each cell comprises cell elements indicated generally at numeral 4 and including liquid electrolyte 5 of dilute sulfuric acid disposed in the cell and a set of plates 6, each of which has a pole 7 extended therefrom. The set of plates 6 comprise separators 8 disposed between alternate plates in a conventional manner. The set of plates are shown to be mounted on saddles 9 provided on the case 2 at the bottom wall thereof. The cells are in series connected one cell to adjacent cell by means of conventional connections (not shown) and the cell on one of the extreme sides has a terminal 10 of one polarity connected to the corresponding cell plates through the cover 3 while the cell on the other extreme side has a terminal 10' of the other polarity connected to the corresponding plates through the cover 3, both in a conventional manner.

Figure 4A:
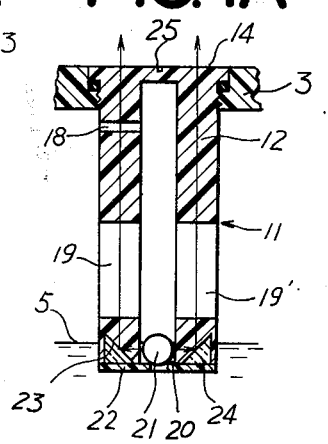
FIG. 4A is an enlarged and vertical view of the indicator when the electrolyte level in the storage battery becomes less than predetermined.
Figure 2B:
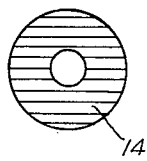
FIG. 2B is a top view of the indicator shown in FIG. 2A.

An indicator device in accordance with the present invention is generally indicated at numeral 11 and comprises a cylindrical hollow body 12 which is essentially made of electrically insulating and acid resisting transparent material, such as acrylic resin, styrene resin and the like. The cylindrical body 12 may extend through a tapped hole 13 provided in the cover 3 for suspension of the body from the cover and may comprise a flanged head 14 at the upper end thereof received in an annular recess 15 provided in the cover 3 to coaxially communicate with the hole 13 so that the head 14 may be exposed to the top of the cover 3 and flush at the top of the head with the top of the cover and a thread 16 provided on the outer periphery of the body 12 immediately below the flanged head 14 and threadedly engaged with the tapped wall of the hole 13 in the cover. The head 14 may be provided with a groove 25 engaging a tool, such as a screw driver therewith for threadedly engaging the cylindrical body 12 at the threaded portion 16 thereof with the tapped wall of the hole 13. In order to prevent the leakage of the electrolyte through the hole 13 and the recess 15 in the cover 3, there is provided an O-ring seal 17 held between the flanged head 14 and the wall of the recess 15 in the cover. The cylindrical body 12 may have a radial aperture 18 provided in the wall of the cylindrical body 12 immediately below the threaded portion 16 thereof for communication of air therethrough and two diametrically opposing slots 19 and 19' provided in the wall of the cylindrical body 12 adjacent to the lower end thereof for communication of the electrolyte into and out of the body. As shown in FIG. 4A, the cylindrical body 12 has an opening end 20 essentially extending slightly below minimum allowable level of the electrolyte in the case 2. Thus, when the electrolyte is maintained at more than the minimum level, then the electrolyte is received in the cavity of the cylindrical body 12 and when the electrolyte level becomes lowered to reach the minimum allowable level, then the electrolyte level is substantially at the bottom of the cylindrical body 12 as shown in FIG. 4A.

A ball-like float 21, which is made of electrically insulating and acid resisting material, such as vinyl chloride resin, for example and which may be preferably colored, such as of red, for example to prevent the failure to distinguish it from the colors which the cover 3 and the body 12 have, is disposed in the longitudinal cavity of the cylindrical body for vertical movement of the float 21 therein. An annular closure plate 22 is bonded to the bottom surface of the cylindrical body 12 by means of any suitable means, with the inner edge of the plate 22 adapted to hold the ball-like float 21 for prevention of its removal out of the cylindrical body 12 when the electrolyte would be lowered at less than the minimum allowable level. It should be noted that the float 21 is essentially transparent so as to allow light to pass therethrough for the reason as described hereinafter. Also, it should be noted that the float has a specific gravity less than that of the electrolyte in the case when the storage battery is charged at more than minimum allowable degree and substantially identical to or greater than that of the electrolyte when the storage battery has been discharged until it has the minimum allowable degree of its charging condition. As well known, the specific gravity of the electrolyte varies with the temperature which the electrolyte has and therefore, it will be understood that the specific gravity of the float 21 is determined depending upon the temperature at which the storage battery is installed.

Figure 3A:
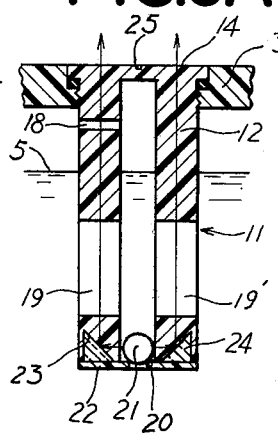
FIG. 3A is an enlarged and vertical sectional view of the indicator when the storage battery is discharged at less than predetermined degree of charging condition.

In order to reflect light through the thickness in the cylindrical body 12 in a parallel direction to the longitudinal axis thereof from the vertical direction to the horizontal and then vice versa, there is provided an annular reflective means in the cylindrical body 12 adjacent to the lower end thereof, which in the illustrated embodiment comprises a slant surface 23 of an annular notch or groove 24 provided in the extreme bottom wall of the cylindrical body 12 and closed by the enclosure plate 22 for confinement of air in the space defined by the groove wall and the enclosure plate. It will be found that the slant surface 23 is directed inwardly and diametrically so that light reflected by the surface can pass through the float 21 positioned as shown in FIGS. 3A and 4A. It will be understood that reflective means may alternatively comprise an annular prism inserted into the cylindrical body 12 adjacent to the lower end thereof. With the arrangement of the annular reflective means, since it never contacts the electrolyte even though the latter has a level which is over the reflective means, light from the upper face of the head 14 is always reflected and then returned to the upper face of the head, as will be described hereinafter.

Figure 2A:
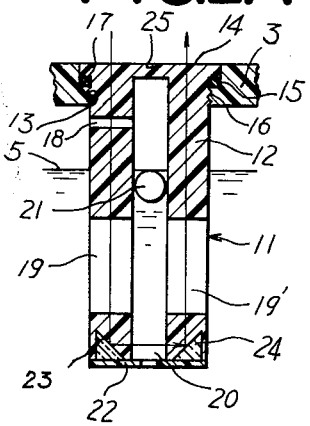
FIG. 2A is an enlarged and vertical sectional view of an indicator in accordance with the present invention when the storage battery is charged at more than predetermined degree.

If the storage battery has been charged at more than the predetermined degree of its charging condition, then the float 21 is located adjacent to the electrolyte level because of its specific gravity being more than that of the float to thereby lie in a spaced relation to the bottom of the cylindrical body 12 as shown in FIG. 2A. Therefore, light from the upper face of the head 14 through the thickness of the cylindrical body 12 passes downwardly to the reflective surface 23 where it reflects in the horizontal direction and through the electrolyte in the body 12 and then reflects vertically by means of the reflective surface 23 to pass upwardly through the thickness of the cylindrical body 12 to project out of the upper face thereof. Thus, the operator will observe a reflective shine when he looks into the upper face of the cylindrical body of the indicator 11 on the storage battery. It will be understood that the radial aperture 18 in the body communicates gas in the cavity of the body with the gas space in the case 2 to relieve it out of the cavity as the electrolyte level upwardly moves, such as during supplement of water into the case.

Figure 3B:
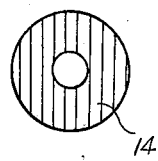
FIG. 3B is a top view of the indicator shown in FIG. 3A.

If the storage battery has been discharged so that the specific gravity of the electrolyte becomes less than the minimum allowable value at a predetermined temperature, then the ball-like float 21 moves downwardly within the electrolyte 5 because the specific gravity of the float is greater than that of the electrolyte until the float 21 reaches the enclosure plate 22 in alignment with the reflective surface 23 as shown in FIG. 3A. Thus, light from the upper face of the head 14 through the thickness of the cylindrical body 12 passes through the transparent and colored float 21 after it reflects on the reflective surface 23 and then projects from the upper face of the head 14. Therefore, when the operator looks into the head 14 of the indicator 11, he will observe a red annulus therein, as shown in FIG. 3B.

Figure 4B:
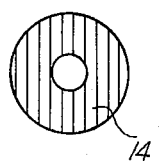
FIG. 4B is a top view of the indicator shown in FIG. 4A.

In some cases, the electrolyte level becomes often lowered due to evaporation of water or decomposition of the electrolyte into gas to reach the minimum allowable level at which the cylindrical body 12 at the lower end thereof is designed to lie. In such cases, the ball-like float 21 lies at the position in which the float aligns with the reflective surface 23 as shown in FIG. 4A, in the same manner as described in connection with FIG. 3A. Therefore, the operator will observe a red annulus in the indicator 11 as shown in FIG. 4B.

Although the operator cannot distinguish the insufficiency of water from the critical charging condition only through what is the condition of the head 14, he can easily examine the electrolyte level in the case to thereby ascertain whether the storage battery has been critically discharged.

While the invention has been described in connection with a preferred embodiment thereof, it will be appreciated that various changes and modifications can be made without departing from its scope. It is therefore intended that the invention is defined only by the appended claims.

What is claimed is:

1. An indicator in use with a lead storage battery comprising a case and battery elements disposed in said case, said battery elements including electrolyte and a set of plates, said indicator adapted to indicate the over-discharged state of said storage battery and also the lowered level of said electrolyte below minimum allowable level, said indicator comprising a single cylindrical hollow body of transparent material with the upper end of said body exposed at the top of said case and with the lower end of said body dipped in said electrolyte, said lower end of said body having an opening to receive said electrolyte in said hollow body therethrough and positioned substantially at said minimum allowable level of said electrolyte, reflective means disposed adjacent to the lower end of said cylindrical body in a manner in which said reflective means is sealed in said body so as not to contact said electrolyte to always reflect light from the upper face of said cylindrical body therethrough in a vertical direction and then in an inwardly diametrical direction, said reflective means comprising a closure plate and a slant surface together defining an annular groove provided in the lower portion of said cylindrical body, said closure plate sealed to said cylindrical body to provide a body-to-air interface at said slant surface as the reflective means, and a colored float disposed in the hollow portion of said cylindrical body for vertical movement therein and having a specific gravity less than that of said electrolyte when said storage battery is charged at more than a minimum allowable degree and greater than that of said electrolyte when said storage battery is discharged beyond said minimum allowable degree of charging condition, said colored float cooperating with said reflective means to provide a colored annulus at the top of said cylindrical body for indicating one of said over-discharged state and said lowered level of said electrolyte.

2. An indicator as set forth in claim 1, wherein said cylindrical body comprises a flanged head and a threaded portion on the outer periphery of said body and wherein said case includes a recess at the top thereof receiving said flanged head and a tapped hole in said case at the top thereof threadedly engaged with said threaded portion on said cylindrical body whereby said cylindrical body is secured to said case.

* * * * *